United States Patent
Creemer et al.

(10) Patent No.: US 7,814,492 B1
(45) Date of Patent: Oct. 12, 2010

(54) SYSTEM FOR MANAGING RESOURCES PARTITIONS HAVING RESOURCE AND PARTITION DEFINITIONS, AND ASSIGNING A NAMED JOB TO AN ASSOCIATED PARTITION QUEUE

(75) Inventors: David Zachary Creemer, Palo Alto, CA (US); David Anthony Kramer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1587 days.

(21) Appl. No.: 11/101,951

(22) Filed: Apr. 8, 2005

(51) Int. Cl.
*G06F 9/46* (2006.01)
*G06F 15/173* (2006.01)
*G06F 15/16* (2006.01)

(52) U.S. Cl. ............. 718/104; 718/100; 718/102; 709/226; 709/229

(58) Field of Classification Search ............ 718/102, 718/104, 105, 100; 709/201, 229, 226
See application file for complete search history.

(56) References Cited

U.S. PATENT DOCUMENTS

| | | | |
|---|---|---|---|
| 5,371,887 A * | 12/1994 | Yoshida et al. | 718/107 |
| 6,289,369 B1 * | 9/2001 | Sundaresan | 718/103 |
| 6,597,956 B1 * | 7/2003 | Aziz et al. | 700/3 |
| 6,732,139 B1 * | 5/2004 | Dillenberger et al. | 718/102 |
| 6,973,500 B1 * | 12/2005 | Yamamoto et al. | 709/229 |
| 7,093,250 B1 * | 8/2006 | Rector | 718/100 |
| 7,415,417 B2 * | 8/2008 | Boyer et al. | 705/1 |
| 7,467,102 B2 * | 12/2008 | Barsness et al. | 705/26 |
| 2005/0278441 A1 * | 12/2005 | Bond et al. | 709/223 |
| 2005/0283782 A1 * | 12/2005 | Lu et al. | 718/100 |
| 2006/0150157 A1 * | 7/2006 | Fellenstein et al. | 717/126 |
| 2006/0167966 A1 * | 7/2006 | Kumar et al. | 709/201 |

* cited by examiner

*Primary Examiner*—Meng-Ai An
*Assistant Examiner*—Tammy Lee
(74) *Attorney, Agent, or Firm*—Fish & Richardson P.C.

(57) ABSTRACT

Systems and methods for resource management are provided. In one implementation a computing system is provided. The computing system includes a controller having an associated information base; the information base including a plurality of resource definitions, a partition definition defining a plurality of partitions, and a plurality of queues. Each partition includes a grouping of one or more resources available to process user jobs and each partition has a name. At least one queue of the plurality of queues is associated with each partition in the partition definition. The controller includes an administrative interface for managing partitions, resources and queues and an authorization routine operable to receive named jobs, a named job identifying a partition in the partition definition, and assign named jobs to an associated partition queue for processing by one of the resources in an associated grouping of one or more resources.

38 Claims, 8 Drawing Sheets

SYSTEM FOR MANAGING RESOURCES PARTITIONS HAVING RESOURCE AND PARTITION DEFINITIONS, AND ASSIGNING A NAMED JOB TO AN ASSOCIATED PARTITION QUEUE

BACKGROUND

The present invention relates to resource management systems.

Conventionally, resource management systems manage a variety of resources in the performance of different tasks or jobs among the resources. Typically, a resource management system allocates received jobs to different resources, for example, different computing devices. A job is allocated to one or more of the resources according to resource requirements describing the job included with the submitted job.

One conventional resource management system is shown in FIG. 1. FIG. 1 illustrates a conventional resource management controller ("controller") 100 that includes a set of resources 102 and a job queue 104. The set of resources 102 typically includes a listing of physical resources to which jobs can be assigned by the controller 100. An input 106 and output 108 allow data to be input and output from the controller 100. Typically, the controller 100 receives a job (or a job specification that may be used to generate a job), which is placed within the job queue 104. When the job reaches an available position in the queue 104 (e.g., at a top of the queue 104), the controller 100 assigns the job to one or more resources based on the requirements of the job. The assigned resources from the resources 102 then process the job.

SUMMARY

Systems and methods for resource management are provided. In general, in one aspect, a computing system is provided. The computing system includes a controller having an associated information base. The information base includes a plurality of resource definitions, a partition definition defining a plurality of partitions, and a plurality of queues. Each partition includes a grouping of one or more resources available to process user jobs and each partition has a name. At least one queue of the plurality of queues is associated with each partition in the partition definition. The controller includes an administrative interface for managing partitions, resources and queues. The controller includes an authorization routine operable to receive named jobs, a named job identifying a partition in the partition definition, and assign named jobs to an associated partition queue for processing by one of the resources in an associated grouping of one or more resources.

Advantageous implementations can include one or more of the following features. Each resource definition can include a name of each resource, a capability of each resource, and an access control list associated with each given resource. The authorization routine can be operable to use the access control list to determine if a user submitting a named job is authorized to have the identified partition process the named job. The plurality of resource definitions can include one or more processing rules and an authorization routine operable to use the processing rules to determine whether to process a named job. The processing rules can specify one or more requirements for processing a received named job. The resources can be computing resources. The partition definition can include a list of partitions and a definition for each partition, a name of a partition, and metadata. The metadata can include capability information for each resource assigned to the partition.

The controller can include a scheduler for scheduling jobs in the plurality of queues for processing. The controller can include a distinct scheduler for each queue of the plurality of queues. The administrative interface can include a user interface for managing the resources assigned to each partition. The authorization routine can determine whether the user is allowed to designate the named partition of the submitted job. The authorization routine can determine whether a job scope is proper for the resources in the designated partition. The information base can be a database. The computing system can further include one or more data sets for providing, to one or more of the resources, data allowing the one or more resources to process named jobs.

In general, in one aspect, a method for managing resources is provided. The method includes providing a partition of resources, each partition having a name and receiving a job from a user, where the job designates a partition. The method also includes verifying the user as authorized to submit a job to the partition and placing the job in a queue associated with the partition.

Advantageous implementations can include one or more of the following features. Verifying the user can include comparing information associated with the user to an access control list of allowed users. The method of resource management can further include verifying the job as appropriate for the partition. Verifying the job can include applying one or more rules to the job to determine if the job is appropriate for the partition. The method of resource management can further include processing the job by one or more resources associated with the partition. The method can further include scheduling the processing of a job in the queue including identifying available resources and assigning the job to one or more available resources. The method can further include managing a list of resources associated with one or more grids. The managing can include updating an availability of the one or more resources and updating performance data associated with the one or more resources.

The method can further include creating new partitions, the partitions including a partition name, and a definition having an associated queue and a list of associated resources. The method can further include administering the partition including adding one or more resources and assigning the added resources to one or more partitions. The administering the partition can further include dynamically adding or removing resources from a partition using an input from an administrative user. The method can further include partitioning privileges such that authorized users of a particular partition can modify one or more partition properties or an associated queue. Receiving a job from the user can include receiving the job without any associated resource requirements for processing the job.

The invention can be implemented to realize one or more of the following advantages. Predefined grids can be generated in a resource management system. The predefined grids can include a set of resources for performing jobs submitted to the grid. Jobs can be submitted to a particular grid without defining the resource requirements necessary to perform the job. A user can submit a job by only providing the job and designating a grid. A single controller of the resource management system can manage all of the predefined grids. The grid can define a partition of resources for performing jobs submitted to the grid. The partition of resources can be based on different criteria including performance capabilities of the resources and software requirements. Data sets can be provided to the resources of each grid to ensure the resources can perform the jobs submitted to the grid.

Each grid can have a designated queue for jobs submitted to a given grid. An access control list can be associated with each grid such that only authorized users can submit jobs to a particular grid. The grid can also have a set of associated rules that govern whether or not a particular job is appropriate for the grid. The grid can also include a partition of privileges such that some authorized users of the grid can modify grid properties. Authorized users can manipulate the grid associated queue to remove jobs or modify the order of jobs within the queue.

An administrator of the controller can manipulate existing grids. The association of resources to a grid can be modified to accommodate different jobs. Resources can be added to a particular grid in order to accommodate current needs of the grid in performing submitted jobs. New resources can be added to one or more grids such that a job submitted to a particular grid can be performed by additional resources. The administrator can also update the resource list for availability and performance characteristics of individual resources.

A scheduler can be associated with each grid for managing the grid's queue. The scheduler can define when a job is to be performed by the resources associated with the grid as well as assign particular resources to perform the job. A separate scheduler can be included with each grid, or alternatively, a single scheduler for the controller can manage the queues of all the grids.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
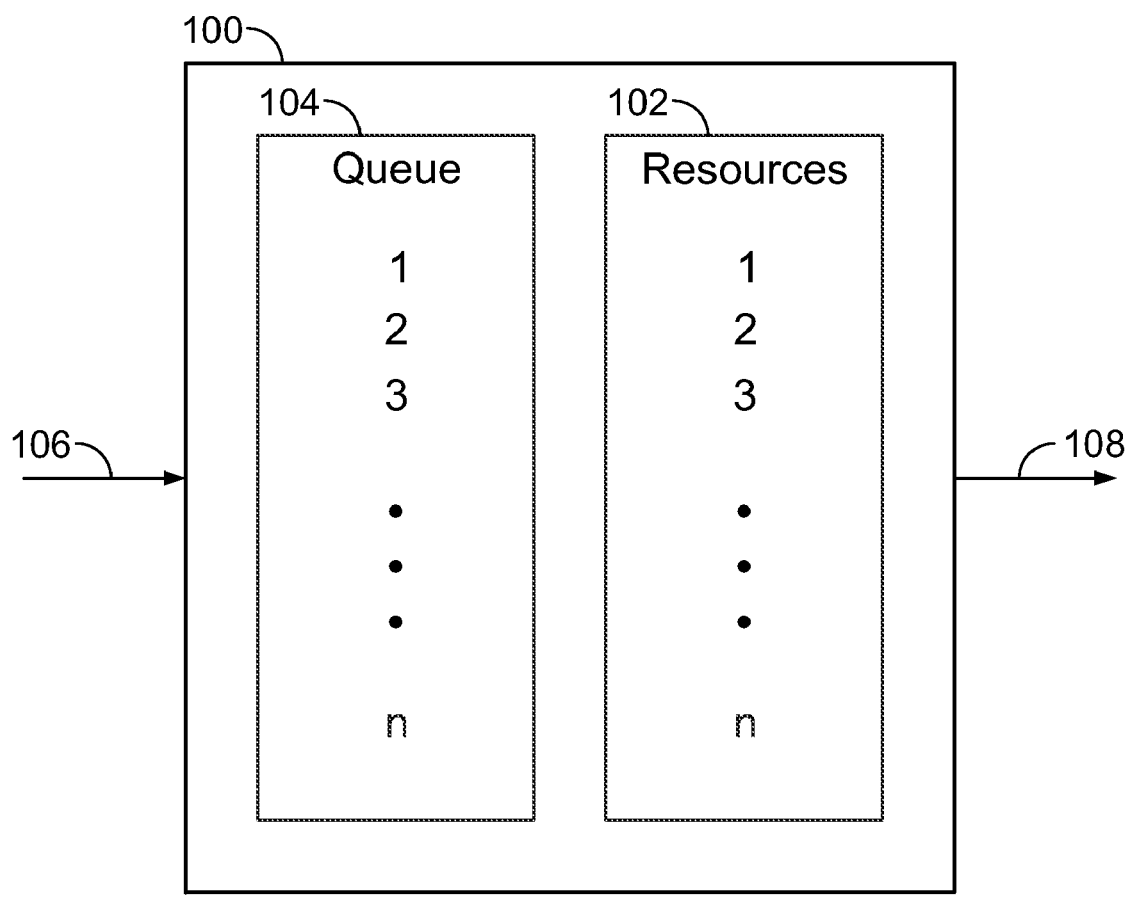
FIG. 1 is a block diagram of a conventional resource management system.
Figure 2:
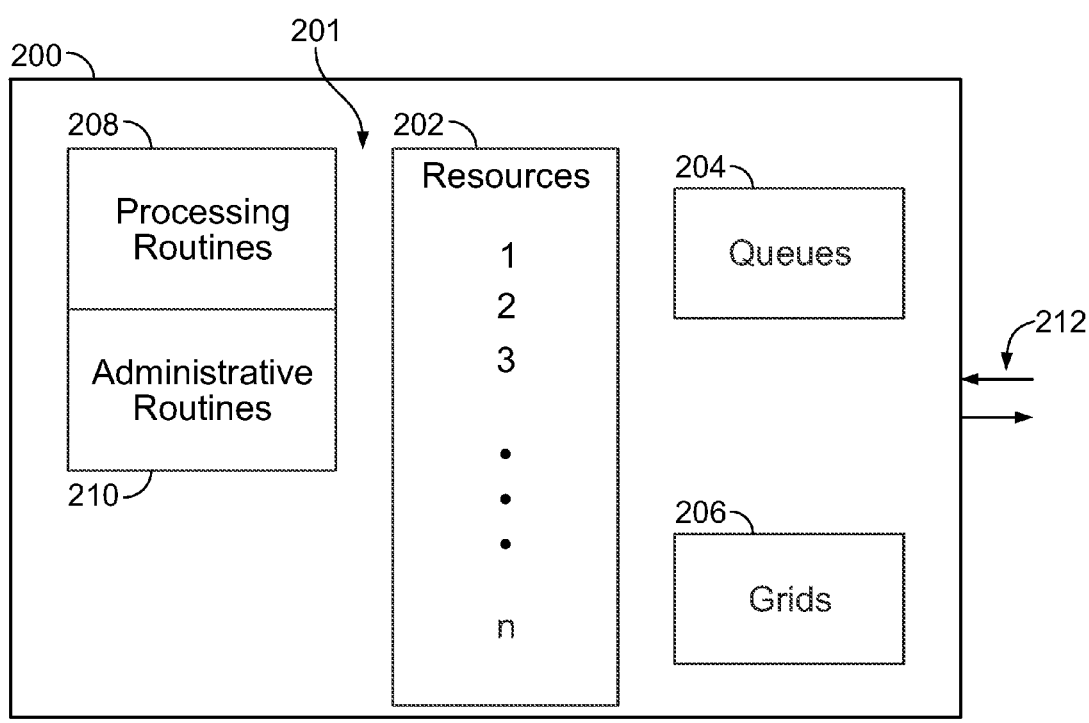
FIG. 2 is a block diagram of a resource management system including a central unified controller.

FIG. 2 illustrates an example of a resource management controller 200 for use in, for example, a grid computing system. Resource management controller 200 includes an information store having one or more resource definitions ("resources") 202, queues 204, one or more partition (i.e., grid) definitions ("grids") 206, processing routines 208, administrative routines 210, and an input/output interface 212.

Each resource in resources 202 includes a resource definition. A resource definition identifies the resource (e.g., name), and can include metadata about the resource. The metadata can include performance, capability, location, availability, and allocation data associated with the resource. Resources 202 can include a logical listing of physical resources that can be used to process jobs. For example, in one implementation, resources 202 can include a list of resources corresponding to a number of different physical computer workstations. For simplicity, a reference to resources 202 of the resource management controller 200 can be considered the same as a reference to the corresponding physical resources.

The queues 204 include distinct queues, at least one for each grid, having a list (e.g., an ordered list) of jobs to be processed by one or more resources in the resources 202. Each queue in the queues 204 can be associated with a particular grid of the grids 206. Each queue includes a definition, and the definition can identify an ordered list of entries. Each entry in the queue can be a job to be processed. Jobs can have an associated priority and a queue can be ordered in accordance with the priorities.

Each partition (i.e., grid) in the grids 206 includes a grid definition that defines a queue for processing jobs and a set of resources associated with the grid for processing the queued jobs. Each grid of the grids 206 can include a name, a set of resources specifically selected to perform a particular type of job or jobs, and a definition that characterizes the resources within the grid (e.g., processors at location x having computer power y that are capable of performing the particular type of job). Each grid definition can be generated manually by a user or automatically generated according to one or more rules.

The processing routines 208 can manage the processing functions of the resource management controller 200. For example, the processing routines 208 can manage, for example, the receiving of jobs to process, allocation of the received jobs to a queue, the scheduling of the jobs, access control for grids, and grid rules. Additionally, the processing routines 208 can provide updated information regarding the performance and availability of the resources 202. Processing routines are discussed in further detail below.

The administrative routines 210 can manage the administrative functions of the resource management controller 200. For example the administrative routines 210 can include the creation (or deletion) of new grids, addition (or removal) of new resources, and reassignment of one or more resources to different grids. An administrator (e.g., a person or a computer) can dynamically adjust the resources assigned to a particular grid based on predetermined criteria, such as the grid work load, and the performance of the resources. Finally, input/output interface 212 provides access to the resource management controller 200 by users and physical resources associated with the resources 202.

In one implementation, jobs are submitted to the resource management controller 200 for processing from one or more users. A job, as used herein, can include a prepared job as well as a job specification that is used by the resource management controller 200 to generate a job. A user submitting a job identifies the job as to be processed by a particularly designated grid. For example, the submission from a user can include a job and a named grid. In one implementation, when a job is received and associated with a grid, a processing routine 208 associated with the controller 200 can perform access control and authorization processes in order to verify, for example, that the job originated from a user that is authorized to submit jobs to the designated grid and that the job is a proper job to be performed by the resources associated with the grid. In one implementation, the processing routine 208 can also perform authentication processes to determine the identity of the user. After performing the access control and authorization processes, an acceptable job can be placed within a queue for a designated grid. Once in the queue, the job can be scheduled for processing by a scheduler. The scheduler can schedule a job in a queue for processing and assign resources associated with the designated grid to perform the job processing. Once the conditions in the schedule are met, the job is processed.

Grid Computing System

Figure 3:
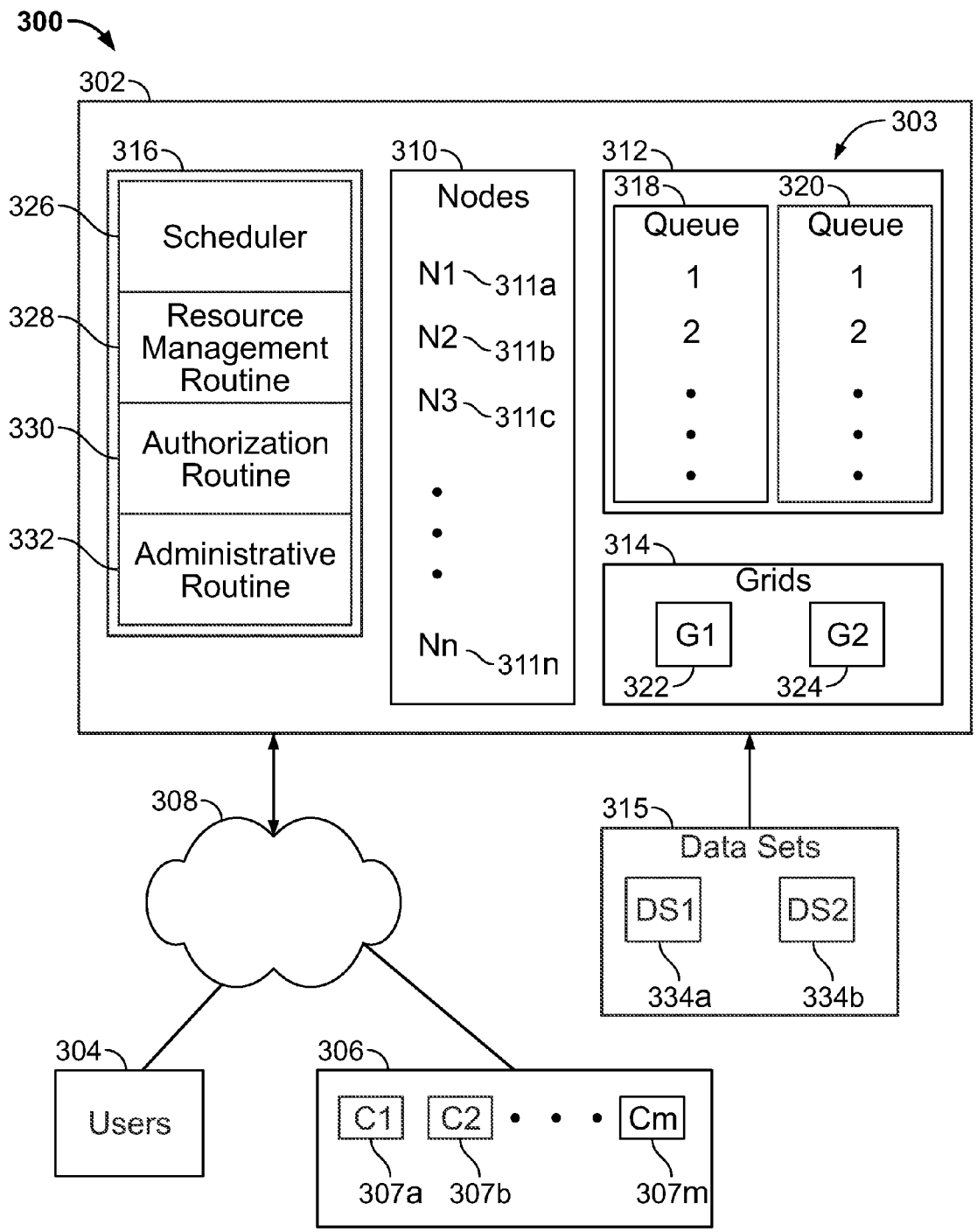
FIG. 3 is a block diagram of a grid computing system.

In one implementation a resource management system can be implemented in a grid computing environment. FIG. 3 illustrates a grid computing system 300. Grid computing system 300 includes a controller 302, one or more users 304, and a number of computing devices 306. A network 308 provides for communication between the users 304, controller 302, computing devices 306, and data sets 315. The network 308 can be any communication system that allows data transmission between discrete devices. For example, the network 308 can be a local communication system such as a local area network ("LAN") or a distributed network such as a wide area network ("WAN").

The users 304 can include one or more computing systems associated with one or more different individuals providing input, for example, through a computer workstation. In one implementation, each user 304 can have an associated profile. In another implementation a single individual can have several different profiles where each profile can include different access control and authentication information. The users 304 are shown in FIG. 3 as a single block for simplicity, however the different computing devices associated with the users 304 can be distributed across one or more networks.

The computing devices 306 are the resources which are used to process jobs associated with the grid computing system 300. The computing devices 306 can include a number of computing devices 307a-307m, which can include computer workstations, servers, and mainframe computers, other computing devices, and combinations of such devices. In one implementation, the computing devices 306 can also include different output devices such as printers, mail servers, and other devices such as personal digital assistants, mobile telephones, displays, and recording/playback devices.

The controller 302 includes an information base 303 having resources 310, queues 312, grids 314, and routines 316. The resources 310 include a logical list of nodes 311a-311n for performing jobs. In one implementation, each node 311 of the resources 310 corresponds to a physical computing device 307 of computing devices 306.

The queues 312 include a number of different job queues. FIG. 3 illustrates a controller 302 having two job queues 318 and 320. In other implementations, the controller 302 can include any number of job queues. In one implementation, each of the job queues 318, 320 receive jobs to be performed (e.g., from users 304) using a particular grid 314. In one implementation, each new job is entered at a tail end of a first in-first out queue. Jobs are removed from a job queue once performed by the assigned computing devices 306 or alternatively, at a time of queue rollover. In another implementation, jobs can be placed in a different queue position according to a priority of the job.

The grids 314 include a number of distinct grids. For example, in FIG. 3, the grids 314 include grids 322 and 324. In another implementation, many different grids can be included in the grids 314. In one implementation, each grid 322, 324 has a corresponding queue in the queues 312. Each grid 322, 324 can have a grid definition (G1, G2) that includes a partition of nodes 310. For example, grid 322 can define a partition of nodes 311a and 311b and designate queue 318. The partition of nodes for each grid defines the resources assigned to the grid for processing received jobs. Jobs directed to the grid 322 can then be routed to the queue 318 for processing by the computing devices 307 associated with the nodes 311a and 311b.

Each grid 322 can be named such that a user 307 can submit a job to a particular named grid. For example, the grid computing system 300 can be implemented in a research laboratory setting. Different groups of users, for example, researchers, can be assigned to different grids for performing jobs. For example grids can be defined such as a "biology" grid, a "chemistry" grid, and a "physics" grid. Thus, physics researchers submit jobs to the "physics grid" while biology researchers submit jobs to the "biology" grid. In one implementation, a researcher who performs tasks in both biology and chemistry can submit jobs to both the biology and chemistry grid. For example, the user can have a profile associated with each field of research, such that the user can access both grids. In an alternative implementation, the user can have different profiles directed towards each research area such that the user assumes a profile associated with biology research when submitting a job to the biology grid. Access control for each grid is discussed in further detail below.

The node partition defined by each grid definition (e.g., G1 and G2) identifies a set of one or more nodes (N1, N2, . . . Nn) that can be used to perform a job. The grid definition includes requirements associated with the nodes associated with the grid. For example, the set of one or more nodes can have particular software or performance requirements as defined by the grid definition. Consequently, in one implementation, each grid can be created in advance by an administrator such that the set of nodes for the grid are suitable for performing a class or classes of jobs. In another implementation, a node 311 can be a member of more than one grid definition. If not all of the assigned nodes 311 satisfy grid requirements, necessary data sets can be provided by the data sets 315. In one implementation, an administrative user can manually define the grid including assigning individual nodes to the grid. In an alternative implementation, the grid definition can be automatically generated according to one or more user defined rules.

In one implementation, each grid definition (G1, G2) has an associated access control list that identifies the users 304 allowed to submit jobs to the grid. The access control list can designate authorized users 304, as well as privileges for individual users. Privileges are discussed in further detail below. Additionally, the access control list can include a set of rules or authorization parameters that can be used to determine whether or not a submitted job is proper for a given grid. For example, a job may require more resources then are available to the grid such that the job cannot be performed.

Controller 302 further includes a plurality of routines 316 that operate to manage functioning associated with the controller 302. Each routine can be a computer program product encoding a series of instructions for managing the operation of the controller 302. The routines 316 include a scheduler 326, a resource management routine 328, an authorization routine 330, and an administrative routine 332.

The scheduler 326 can coordinate the processing of jobs within the queues 312. The scheduler 326 can update and manage the queues 312 as individual jobs are processed. The scheduler 326 can also assign jobs to particular nodes 311 within an associated grid for the queue 312. A job can be assigned to one or more nodes 311 depending on the resources necessary to process the job and the availability of the nodes 311. In one implementation, a separate scheduler 326 is employed for each grid. Each scheduler 326 can employ an algorithm for assigning jobs in the queue to nodes for processing.

The resource management routine 328 can maintain the nodes 311 listed in the resources 310. In one implementation, the resource management routine 328 updates the current status of each node 311, indicating whether or not the node 311 is available to process a job in an associated queue 312. The resource management routine 328 can also monitor the progress of jobs being processed by the nodes. In one implementation, the resource management routine 328 can update performance data associated with one or more nodes. In another implementation, the resource management routine monitors the nodes for problems or disconnects indicating that the node cannot be used. For example, if node 311a is a computer workstation on a network that has a system failure or other problem resulting in a disconnect from the network, the resources 310 are updated to indicate that node 311a is not available to process jobs. Similarly, in another implementation, if new nodes are added by an administrator, the resource management routine 328 can add the newly available nodes to the resources 310.

The authorization routine 330 maintains one or more access control lists (not shown) associated with administrative functions of the controller 302 and management and use of the grids 314. Access control for administrative purposes is discussed in greater detail below. The rules for the grids 314 can include rules for authenticating jobs submitted to a designated grid for processing. The authorization routine 330 can process received jobs. Each received job is checked by the authorization routine 330 according to an access control list to authorize the user submitting the job. The authorization routine 330 can then check one or more rules to determine if the job is an appropriate job for performance by the designated grid. If the job passes both the user and job checks, the authorization routine 330 can add the job to an appropriate queue associated with the designated grid.

The administrative routine 332 can perform administrative functions and provide access to an administrator through a user interface in coordination with the authorization routine 330. For example, the administrative routine 332 can provide an administrator with a user interface for monitoring and manipulating resources 310, grids 314, and other aspects of the controller 302. One example user interface is discussed in detail below with respect to FIGS. 5-8.

The administrative routine 332 can include operations for creating grids and grid definitions, modifying grid definitions, adding and removing nodes, prioritizing jobs, and adding and removing data sets 315. For example, grid definitions can be modified such that the nodes associated with the grid are changed. More nodes can be added to a grid or some nodes can be removed. In one implementation, the nodes for each particular grid can be adjusted based on the number jobs or size of jobs in the queue for the grid. For example, if a job is placed in a queue for a grid that will require a large number of nodes to process, the administrator can add additional nodes to the grid in order to process the job. Additionally, nodes associated with a grid or grids that become unavailable can be replaced with a different node. In one implementation, users with privileges (in accordance with an access control list maintained and administrated by authorization routine 330) can access and manipulate jobs stored in the queues 312. Exemplary privileges can include prioritizing jobs and queue status checking.

In one implementation, the data sets 315 include data required for the nodes of one or more grids 314 to process associated jobs. The data sets 315 can include a plurality of data sets (e.g., 334a and 334b). The data sets 315 can be used to configure one or more of the nodes to, for example, have software necessary for the processing of a job. For example, the computing devices 307 associated with the resources 310 for the grid 322 (e.g., nodes 311a and 311b) may all be required to execute a particular algorithm in order to process jobs received by the grid 322. If a computing device (e.g., node 311a) does not already have the necessary algorithm, a data set can be used to provide the computing device 307a, associated with node 311a, the required algorithm. In one implementation, the data sets 315 are positioned external to the controller 302 in the grid computing system 300. In an alternative implementation, the data sets 315 can be stored in a database within the controller 302.

Operation

Figure 4:
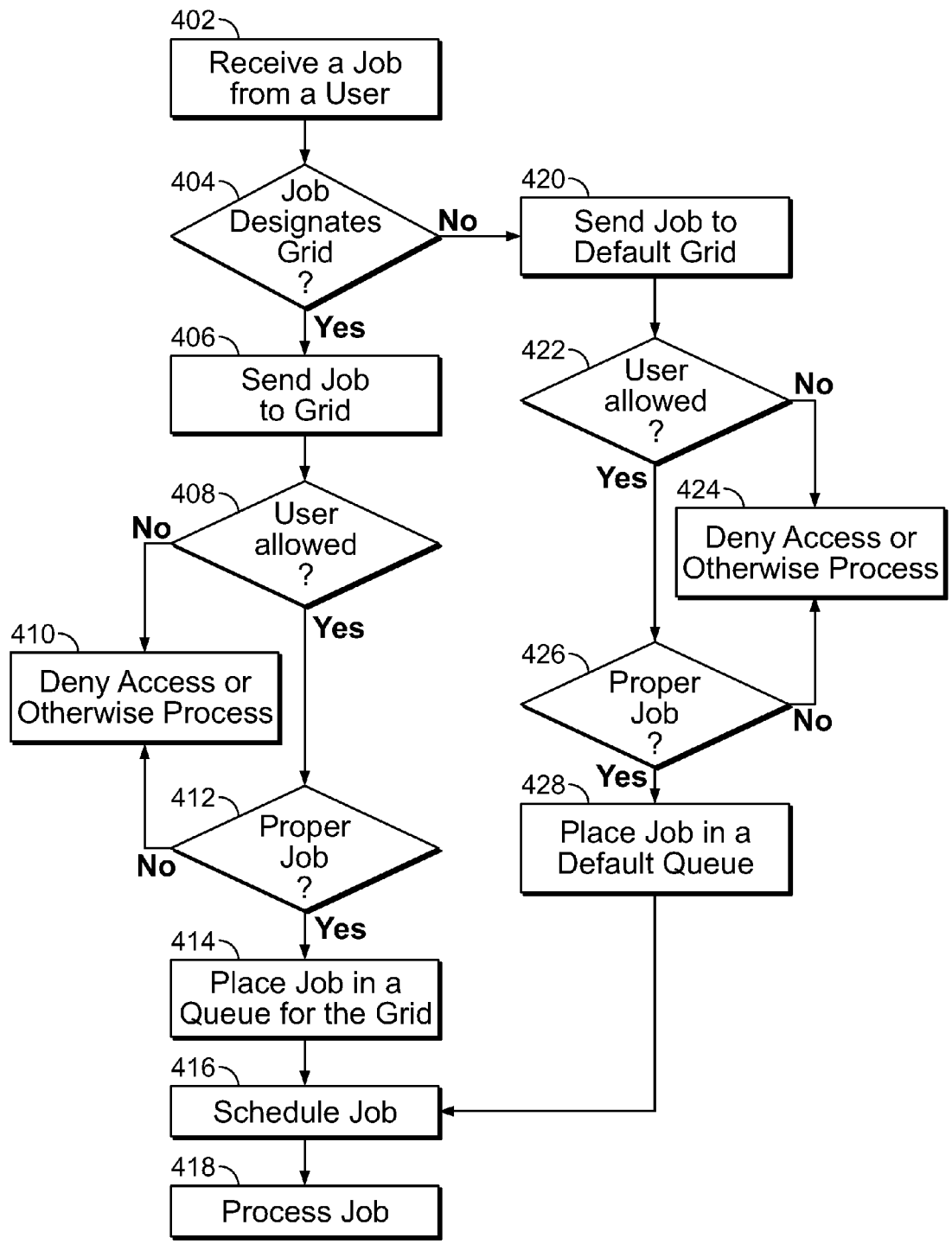
FIG. 4 is a flowchart illustrating an operation of the grid computing system of FIG. 3.

FIG. 4 illustrates an operation of a grid computing system (e.g., grid computing system 300). A job is received from a user by the controller (e.g., controller 302) (step 402). The job is checked to see if a grid is designated for the job (step 404). If a particular grid is designated, the job is sent to the designated grid (step 406). For example, a chemistry researcher from the above example (e.g., the user) can send a job to the controller directed to the chemistry grid. Thus, in one implementation, only a job and a grid name are received by the controller 302.

The grid (e.g., an authorization routine 330 associated with the designated grid) can then compare the job data to an access control list to determine whether or not the user is allowed to submit jobs to the grid (step 408). The access control list can be, for example, an allow list that identifies individual users. The access control list can identify individuals, profiles, or groups of users as allowed. For example, the access control list can identify chemistry researchers as allowed to submit jobs to the chemistry grid, but not allow biology researchers. If the user is not allowed to submit jobs to the grid, the grid (e.g., the authorization routine 330) can deny access to the grid or otherwise process the job (step 410). Otherwise processing can include, for example, notifying the user and prompting the user to select a different grid, alarming the administrator for potential security breaches, and logging the attempted access.

If the user is allowed access, the grid (e.g., the authorization routine 330) can apply one or more rules to check if the job is proper for the grid (step 412). A job may not be proper for the grid even though it is from an authorized user of the grid. For example, the job can be too computationally intensive such that the grid resources are unable to process the job.

If the job is not proper, the grid (e.g., the authorization routine 330) can deny access to the grid or otherwise process the job (step 410). Otherwise processing can include, for example, notifying the user and prompting the user to select a different grid, alarming the administrator for potential security breaches, and logging the attempted access.

If the job is proper, the grid (e.g., the authorization routine 330) places the job in a queue for the grid (e.g., one of the queues 314) (step 414). In one implementation, the queue includes an ordered number of jobs that have been submitted to the grid for processing. In one implementation, the grid places the job at the end of the queue. In another implementation, the grid places the job at a position in the queue using a predetermined criteria, for example a priority parameter associated with the job. For example, some types of jobs can be given a higher priority based on the type of job or the user who submitted the job or because of the urgency of the request. Higher priority jobs can be placed at a higher position within the queue to expedite processing.

After the job is placed in a queue, the job can be scheduled for processing (e.g., by scheduler 326) (step 416). Scheduling includes monitoring a position of the job in the queue, monitoring the nodes associated with the grid for availability, and assigning the job to one or more of the nodes for processing. A job can be scheduled for processing when not at a top of the queue, for example, because a job ahead on the queue requires more nodes then are currently available such that a next job or jobs can be processed by the available nodes before the job at the top of the queue can be processed. The scheduling can include applying an algorithm that identifies which jobs can be processed in particular amounts of time by a particular number of resources.

Computing devices (e.g., computing devices 307) associated with the assigned nodes process the job according to the schedule (step 418). Jobs can be broken up and divided among a number of different computing devices depending on the processing requirements of the job and the available computing devices. The computing devices can provide an output to the user through the controller or directly.

If a job received from a user at step 402 did not designate a particular grid, the job is sent to a default grid (step 420). The default grid can be used to process all jobs submitted without a designated grid. The default grid checks the job to see if the user is allowed to submit a job to the default grid (step 422). In one implementation, the access control list for the default grid includes an allow list for all users who are authorized to submit a job to any grid of the controller. In another implementation, some users may only be able to submit jobs to named grids and not the default grid.

If the user is not allowed to submit an undesignated job (i.e., not authorized to submit a job to the default grid) the grid can deny access to the default grid or otherwise process the submitted job (step 424). Otherwise processing can include, for example, notifying the user and prompting the user to select a different grid, alarming the administrator for potential security breaches, and logging the attempted access.

If the user is allowed access, the default grid (e.g., the authorization routine 330) can apply one or more rules to check if the job is proper for the default grid (step 426). If the job is not proper, the default grid can deny access to the default grid or otherwise process the submitted job (step 424). Otherwise processing can include, for example, notifying the user and prompting the user to select a different grid, alarming the administrator for potential security breaches, and logging the attempted access.

If the job is proper, the default grid places the job in the default queue (step 428). As with the queues for the designated grids, the default queue can include an ordered number of jobs that have been submitted to the default grid for processing. In one implementation, the default grid places the job at the end of the default queue. In another implementation, the default grid places the job at a position in the default queue using a predetermined criteria, for example a priority parameter.

After the job is placed in a queue, the job can be scheduled for processing as discussed above (step 416). In one implementation, the default grid includes all the nodes listed in the resources (e.g., resources 310) as the available nodes for the default grid. In another implementation, the default grid can include a subset of nodes as nodes for processing jobs from the default grid. After the scheduler has scheduled the performance of the job as discussed above, the job is processed by one or more of the computing devices associated with the assigned nodes (step 418).

Administration

In one implementation, a grid computing system (e.g., grid computing system 300) includes an administrative interface for managing the controller (e.g., controller 302). FIGS. 5-8 show screenshots of an administrative interface 500. The administrative interface 500 provides a user interface for managing one or more controllers. The administrative interface 500 includes a main menu 502, a controllers and grids window 510, a status window menu 518, and a status window 516. The main menu 502 includes buttons to add a controller 504, remove a controller 506, and to disconnect 508 from the administrative interface. The administrative user can add or remove controllers to the controllers and grids window 510 using the add a controller 504 and remove a controller 506 buttons. Buttons can be activated and items selected using a cursor of an input device such as a mouse.

Figure 5:
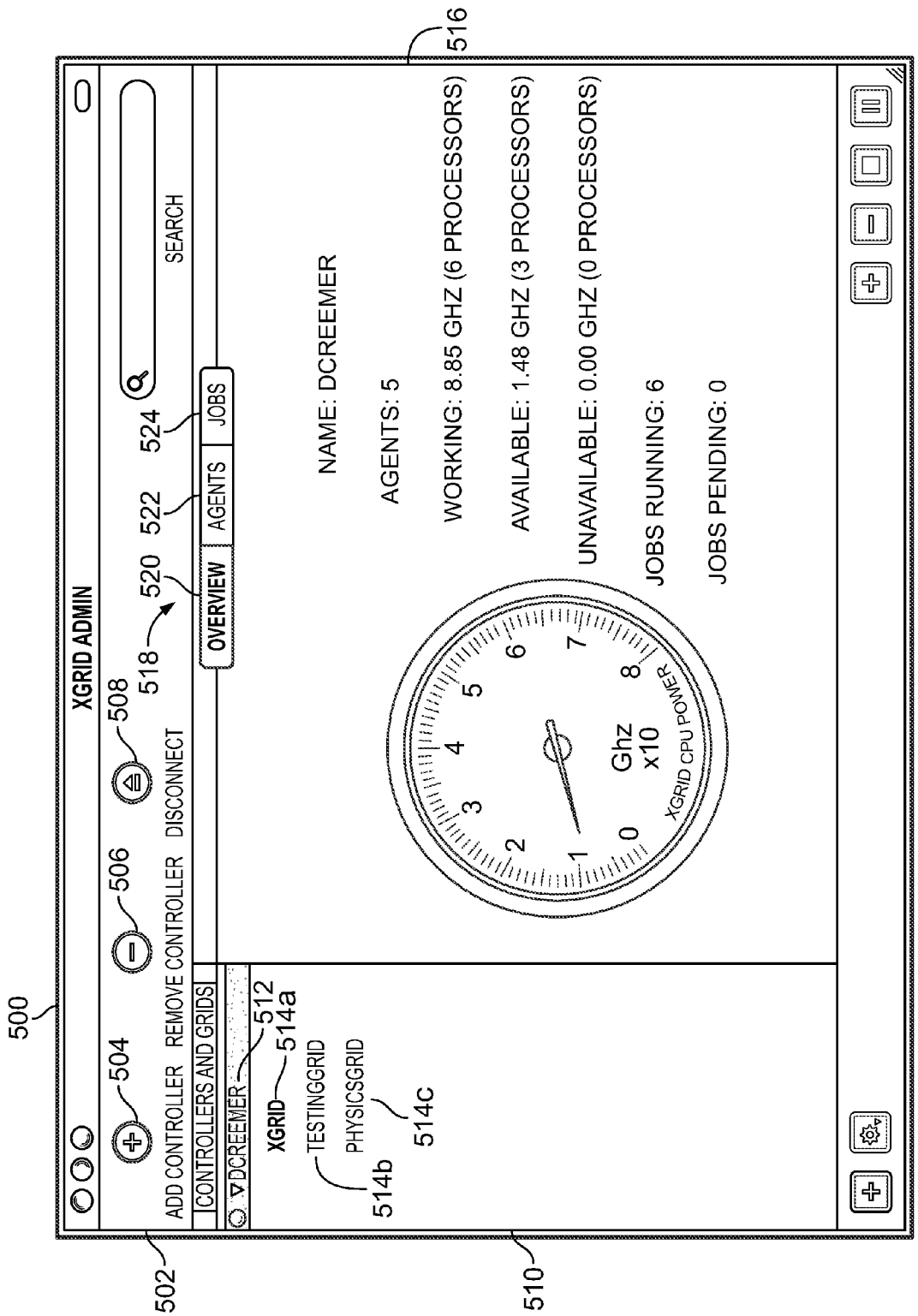
FIG. 5 is a screenshot of an administrative user interface for the grid computing system of FIG. 3 showing an overview of the grid computing system.

The controllers and grids window 510 lists the controllers and grids associated with each controller. In FIG. 5, the controllers and grids window 510 includes a controller 512 and a listing of the grids included in the controller 512. More than one controller can be included. The grids are shown as subsets of the respective controller. In the example administrative interface 500, the controller 512 is named "dcreemer" and includes three grids: an "Xgrid" 514a, a "testing grid" 514b, and a "physics grid" 514c.

The status window menu 518 determines the type of information displayed in the status window 516. The status window menu 518 includes an overview button 520, an agents (i.e., nodes) button 522, and a jobs button 524. When one of the status window menu 518 buttons is activated, the information for that button is then displayed in the status window 516.

Referring to FIG. 5, the controller 512 and the overview button 520 are selected as indicated by highlighting. As a result, the status window 516 displays overview information for the controller 512. The overview information includes summary information regarding the controller 512. In one implementation, the summary information includes a name of the controller, a number of agents for processing jobs, a number and computing power of currently working processors associated with the agents, a number and computing power of available processors associated with the agents, a number and computing power of unavailable processors associated with the agents, a number of jobs running, and a number of jobs pending.

Figure 6:
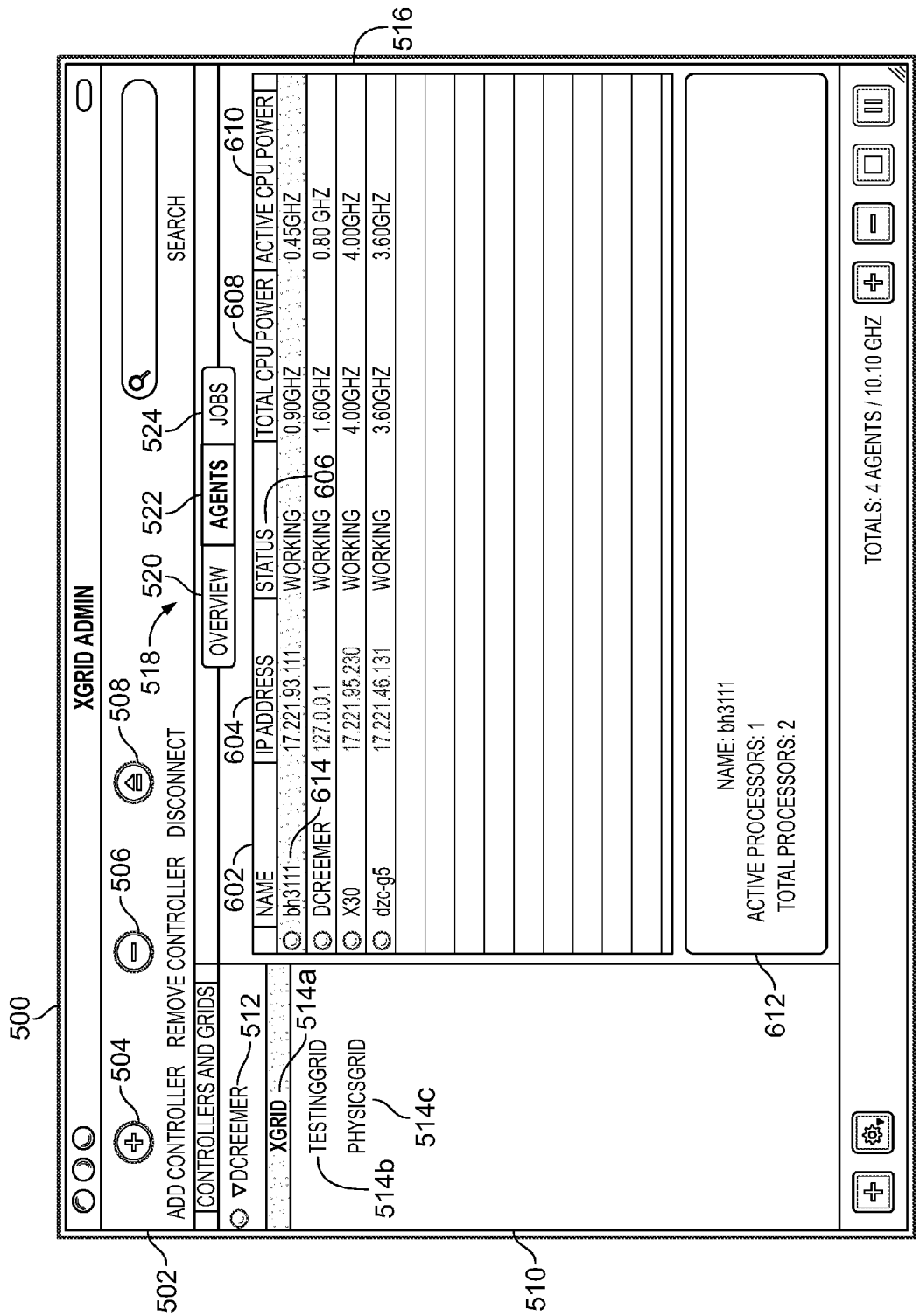
FIG. 6 is a screenshot of an administrative user interface for the grid computing system of FIG. 3 showing the resources associated with a grid.

Referring now to FIG. 6, the grid 514a has been selected from the controllers and grids window 510 as well as the agents button 522 from the status window menu 518. With the grid 514a and the agents 522 menu item selected, the status window 516 displays information regarding the agents associated with the grid 514a. As shown in FIG. 6, the grid 514a includes 4 agents. The status window 516 displays the name 602 of the agent, the location of the agent 604 (e.g., an IP address of the agent), a status of the agent 606 (e.g., working, available, not available), a total CPU power 608 of the agent and an active CPU power 610. A summary section 612 of the status window 516 can provide summary information regarding a selected agent. For example, in FIG. 6, the node "bh3111" 614 is selected. The summary section 612 displays additional information regarding selected node 614 including the name of the node and processor information.

Figure 7:
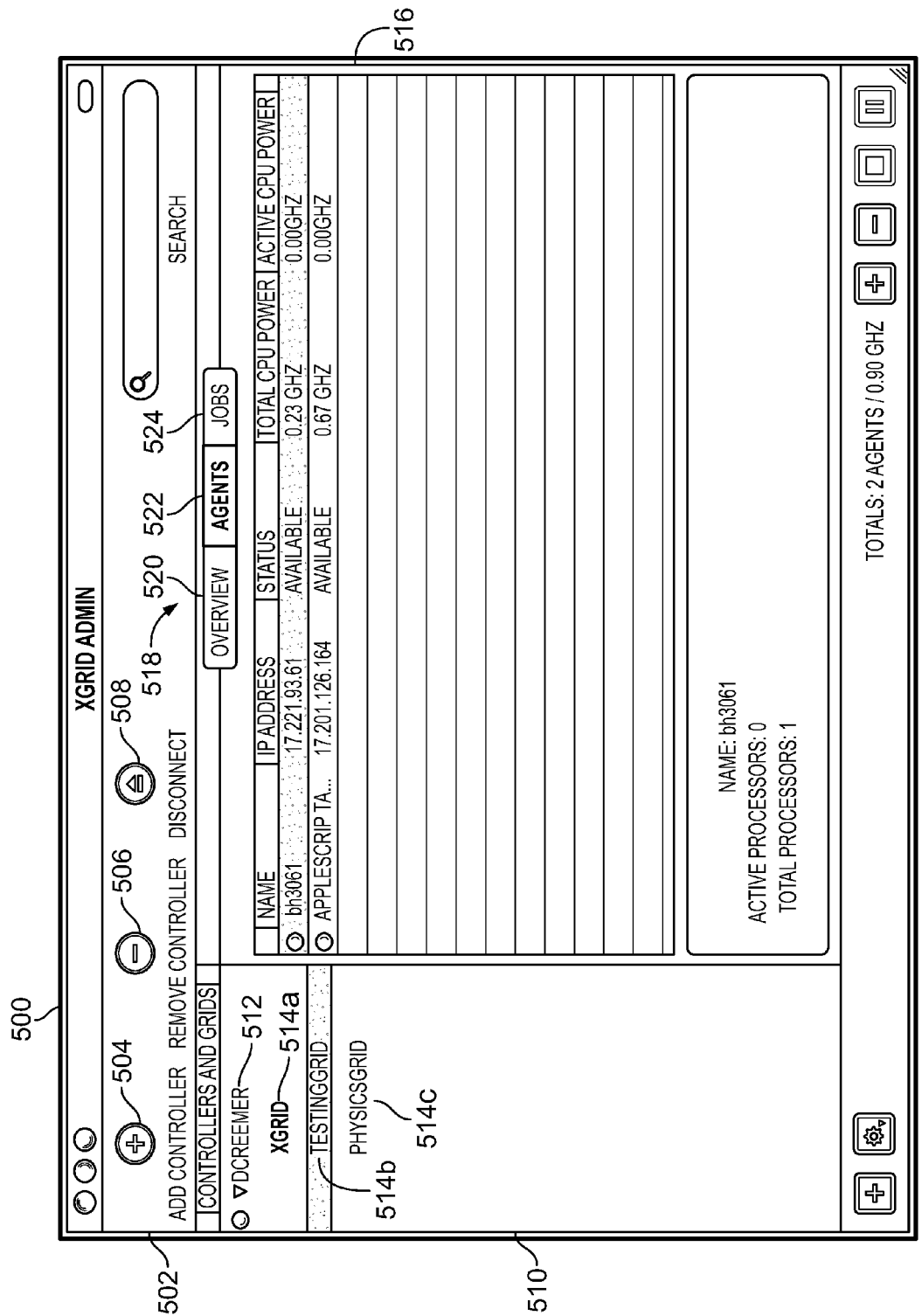
FIG. 7 is a screenshot of an administrative user interface for the grid computing system of FIG. 3 showing the resources associated with a second grid.
Figure 8:
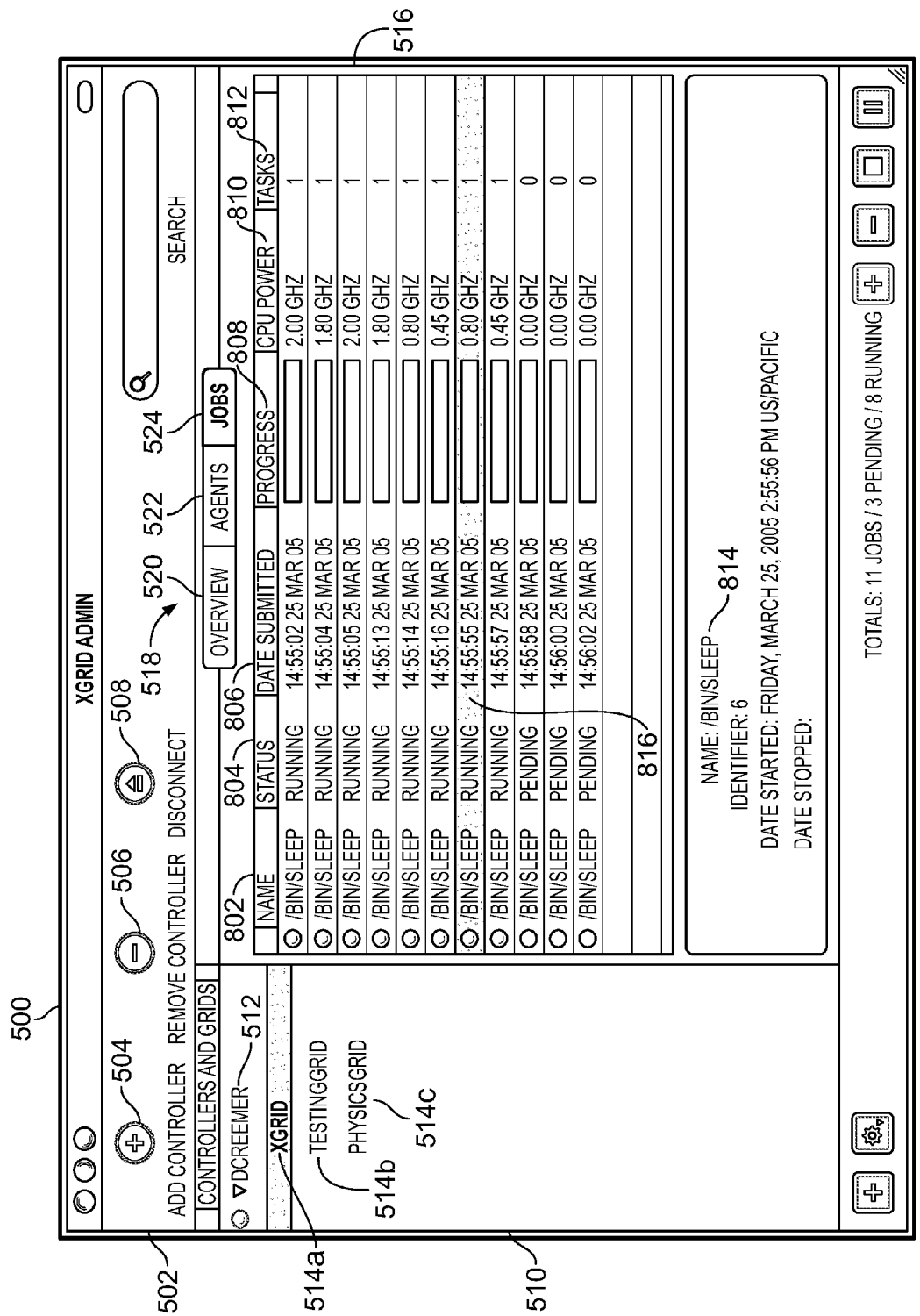
FIG. 8 is a screenshot of an administrative user interface for the grid computing system of FIG. 3 showing the job queue of a selected grid.

Referring now to FIG. 7, the grid 514b has been selected and the agents 522 status window menu item is again selected. Consequently, the status window 516 now displays the agent information for the grid 514b instead of grid 514a. The grid 514b only has two nodes which are both available for processing jobs. Similarly, when the grid 514c is selected, the status window 516 displays the agent information for the grid 514c as discussed above with respect to FIG. 6.

Referring now to FIG. 8, the grid 514a is again selected, however now the jobs button 524, of the status window menu 518, is selected. With the jobs button 524 selected, the status window 516 displays the jobs for the grid 514a. For example, the jobs for the grid can include jobs that have been processed, jobs being processed, and jobs pending in a queue for processing. Status window 516 displays a listing of the jobs for the grid, each job entry including information describing a job name 802, a status of the job 804 (e.g., running, pending), a date submitted to the grid 806, a progress of the job 808, a CPU power used in processing the job 810, and a number of tasks 812 being performed.

As shown in the status window 516, the grid 514a has 11 jobs, of which 8 of the jobs are running (e.g., being processed) and 3 jobs are pending. The progress of the jobs 808 can be illustrated using a progress bar that progresses with the job processing. Alternatively, the progress can be numerically represented, for example, by percentage amount completed. A summary section 814 of the status window 516 provides summary information for a selected job. For example, in FIG. 8, a job 816 is shown as selected. The summary section 814 can provide additional information about the selected job 816 including the job name, an identifier for the job, the date the job was started, and the date the job stopped.

Other Implementations

The resource management system discussed above with respect to FIG. 2 can be applied to a number of different applications. In one implementation, the resource management structure can be applied to a distributed storage system such as a storage area network. Grids can be used to define logical partitions of distinct groups of storage devices in the storage area network. In another implementation, logical partitions can be used to define groups of multimedia resources such as music or video. Additionally, partitions can be defined for groups including different types of electronic devices, for example for use in a home automation system.

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computing system comprising:
   a controller having an associated information base, the information base including a plurality of resource definitions where each resource definition of the plurality of resource definitions include a name of each resource, a capability of each resource, and an access control list associated with each given resource, a partition definition defining a plurality of partitions, each partition including a grouping of one or more resources available to process user jobs, each partition having a name, and a plurality of queues at least one associated with each partition in the partition definition, the controller operable to perform operations including:

managing partitions, resources and queues; and receiving named jobs, a named job identifying a partition in the partition definition, and assigning the named jobs to an associated partition queue for processing by one of the resources in an associated grouping of one or more resources;

where the controller includes an authorization routine operable to use the access control list to determine if a user submitting a named job is authorized to have the identified partition process the named job.

2. The computing system of claim 1, where the plurality of resource definitions include one or more processing rules and further comprising an authorization routine operable to use the processing rules to determine whether to process a named job.

3. The computing system of claim 2, where the processing rules specify one or more requirements for processing a received named job.

4. The computing system of claim 1, where the resources are agents.

5. The computing system of claim 1, where the resources are computing resources.

6. The computing system of claim 1, where the partition definition includes a list of partitions and a definition for each partition.

7. The computing system of claim 6, where the partition definition for each partition includes a name of a partition and metadata.

8. The computing system of claim 7, where the metadata includes capability information for each resource assigned to the partition.

9. The computing system of claim 1, where the controller includes a scheduler for scheduling jobs in the plurality of queues for processing.

10. The computing system of claim 9, where the controller includes a distinct scheduler for each queue of the plurality of queues.

11. The computing system of claim 1, where the administrative interface includes a user interface for managing the resources assigned to each partition.

12. The computing system of claim 1, further comprising an authorization routine that determines whether a user is allowed to designate a named partition of a submitted job.

13. The computing system of claim 1, further comprising an authorization routine that determines whether the job requirements are proper for the resources in a designated partition.

14. The computing system of claim 1, where the information base is a database.

15. The computing system of claim 1, further comprising:
one or more data sets for providing, to one or more of the resources, data allowing the one or more resources to process named jobs.

16. A method for managing resources, comprising:
providing a plurality of partitions of resources, each partition having a name and being associated with a plurality of resources;
receiving a named job from a user, the named job designating a partition of the plurality of partitions;
verifying the user as authorized to submit the named job to the designated partition including using an access control list to determine if the user submitting the named job is authorized to have the designated partition process the named job; and
placing the named job in a queue associated with the designated partition for processing by one or more resources of the plurality of resources associated with the designated partition.

17. The method of claim 16, where using the access control list includes comparing information associated the user to the access control list of allowed users.

18. The method of claim 16, further comprising:
verifying the named job as appropriate for the partition.

19. The method of claim 18, the verifying the named job comprising:
applying one or more rules to the named job to determine if the named job is appropriate for the partition.

20. The method of claim 16, further comprising:
processing the named job by one or more resources associated with the partition.

21. The method of claim 16, further comprising:
scheduling the processing of the named job in the queue, including:
identifying available resources from the plurality of resources associated with the partition; and
assigning the named job to one or more available resources.

22. The method of claim 16, further comprising:
managing a list of resources associated with one or more partitions.

23. The method of claim 22, the managing further comprising:
updating an availability of one or more resources associated with the one or more partitions.

24. The method of claim 22, the managing further comprising:
updating performance data associated with the plurality of resources.

25. The method of claim 16, further comprising:
creating new partitions, the partitions including:
a partition name; and
a definition having an associated queue and a list of associated resources.

26. The method of claim 16, further comprising:
administering the partition, including:
adding one or more resources; and
assigning the added resources to one or more partitions.

27. The method of claim 26, the administering further comprising:
dynamically adding or removing resources from a partition using an input from an administrative user.

28. The method of claim 16, further comprising:
partitioning privileges such that authorized users of a particular partition can modify one or more partition properties or an associated queue.

29. The method of claim 16, where receiving the named job from the user includes receiving the named job without any associated resource requirements for processing the named job.

30. A computer program product, tangibly stored on a computer-readable medium, for managing resources, comprising instructions operable to cause a programmable processor to:
provide a plurality of partitions of resources, each partition having a name and being associated with a plurality of resources;
receive a named job from a user, the named job designating a partition of the plurality of partitions;

verify the user as authorized to submit the named job to the designated partition including using an access control list to determine if the user submitting the named job is authorized to have the designated partition process the named job; and place the named job in a queue associated with the designated partition for processing by one or more resources of the plurality of resources associated with the designated partition.

31. The computer program product of claim 30, further comprising instructions operable to:

verify the named job as appropriate for the partition.

32. The computer program product of claim 30, further comprising instructions operable to:

process the named job by one or more resources associated with the partition.

33. The computer program product of claim 30, further comprising instructions operable to:

apply one or more rules to the named job to determine if the named job is appropriate for the partition.

34. The computer program product of claim 30, further comprising instructions operable to:

schedule the processing of the named job in the queue, including instructions to:

identify available resources from the plurality of resources associated with the partition; and assign the named job to one or more available resources.

35. The computer program product of claim 30, further comprising instructions operable to:

create new partitions, the partitions including:

a partition name; and a definition having an associated queue and a list of associated resources.

36. The computer program product of claim 30, further comprising instructions operable to:

administer the partition, including instructions to:

add one or more resources; and assign the added resources to one or more partitions.

37. The computer program product of claim 36, further comprising instructions operable to:

dynamically add or remove resources from a partition using an input from an administrative user.

38. The computer program product of claim 30, the instructions to receive the named job from the user includes receiving the named job without any associated resource requirements for processing the named job.

* * * * *